United States Patent
Lin et al.

(10) Patent No.: US 11,479,096 B2
(45) Date of Patent: Oct. 25, 2022

(54) CLIP LOCKING DEVICE

(71) Applicant: Hangzhou Golden Sun Auto Parts Co., Ltd., Zhejiang Province (CN)

(72) Inventors: Chenshan Lin, Zhejiang Province (CN); Jinqin Fu, Zhejiang Province (CN); Shaoyong Zheng, Zhejiang Province (CN); Xue'e Wang, Zhejiang Province (CN); Xiaohong Tang, Zhejiang Province (CN)

(73) Assignee: HANGZHOU GOLDEN SUN AUTO PARTS CO., LTD., Hangzhou (CN)

(*) Notice: Subject to any disclaimer, the term of this patent is extended or adjusted under 35 U.S.C. 154(b) by 167 days.

(21) Appl. No.: 16/943,712

(22) Filed: Jul. 30, 2020

(65) Prior Publication Data
US 2021/0394598 A1 Dec. 23, 2021

(30) Foreign Application Priority Data

Jun. 22, 2020 (CN) .......................... 202010573912.3

(51) Int. Cl.
*B60J 7/185* (2006.01)
*F16B 33/00* (2006.01)

(52) U.S. Cl.
CPC ............ *B60J 7/185* (2013.01); *F16B 33/004* (2013.01)

(58) Field of Classification Search
CPC .................................. B60J 7/198; B60J 7/185
See application file for complete search history.

(56) References Cited

U.S. PATENT DOCUMENTS

| | | | | |
|---|---|---|---|---|
| 5,472,256 A * | 12/1995 | Tucker | .................... | B60J 7/102 296/100.18 |
| 7,735,881 B2 * | 6/2010 | Steffens | ................... | B60J 7/141 292/DIG. 31 |
| 10,189,340 B2 * | 1/2019 | Schmeichel | ............ | B60J 7/198 |
| 10,800,234 B2 * | 10/2020 | Dylewski, II | ............ | B60J 7/198 |
| 11,007,856 B1 * | 5/2021 | Fu | ............. | B60J 7/198 |
| 11,097,605 B2 * | 8/2021 | Mahler | .................... | B60J 7/198 |
| 11,148,512 B2 * | 10/2021 | Shi | ............ | B60J 7/198 |
| 11,180,011 B2 * | 11/2021 | Shi | ............ | B60P 7/0807 |
| 11,186,151 B1 * | 11/2021 | Xu | ............ | B60J 7/198 |
| 2019/0225064 A1 * | 7/2019 | Schmeichel | ............ | B60J 7/198 |
| 2020/0324632 A1 * | 10/2020 | Shi | ........ | B60P 7/0807 |
| 2020/0331329 A1 * | 10/2020 | Schmeichel | ............ | B60J 7/198 |
| 2021/0031605 A1 * | 2/2021 | Shi | ............ | B60J 7/198 |
| 2021/0114446 A1 * | 4/2021 | Schmeichel | ............ | B60J 7/041 |
| 2021/0213814 A1 * | 7/2021 | Shi | ........... | B60J 7/198 |

* cited by examiner

*Primary Examiner* — Jason S Morrow

(74) *Attorney, Agent, or Firm* — Muncy, Geissler, Olds & Lowe, P.C.

(57) ABSTRACT

This invention provides a clip locking device including a first clip body, a second clip body, and a fastener. The first clip body has a protruding piece, the first clip body sliding fits with the sliding groove on the guide rail by the protruding piece. The fastener is mounted at the first clip body for pressing the first clip body tightly against the guide rail. The second clip body is detachably connected with the first clip body, the second clip body has a vertical sheet, the vertical sheet is used for connecting with the locking tongue. By the first clip body, the protruding piece, and the fastener, mounted the first clip body to the guide rail, and the position of the first clip body on the guide rail can be adjusted by adjusting the fastener.

10 Claims, 5 Drawing Sheets

CLIP LOCKING DEVICE

CROSS-REFERENCE TO RELATED APPLICATIONS

This Non-provisional application claims priority under 35 U.S.C. § 119(a) on Chinese Patent Application No(s). 202010573912.3 filed on Jun. 22, 2020, the entire contents of which are hereby incorporated by reference.

BACKGROUND OF THE INVENTION

Field of the Invention

This invention relates to a technical field of automobile accessories, and more particularly, to a clip locking device.

Description of the Related Art

At present, some pickup trucks are equipped with guide rails, as shown in FIG. 1. Since pickup trucks often necessary to transport some goods that require waterproofing, so now more and more pickup trucks are starting to mount a cover on the cargo bed for covering the cargo bed by the cover when it rains.

At present, the way of securing the cover to the cargo bed of pickup trucks is secured with clips, and when the clips are mounted to a locking tongue of the cover, the cover is secured to the cargo bed by the clips. Still, the current clips are only suitable for the cargo bed without guide rails, and the existing clips are not suitable for the cargo bed with guide rails because of the existence of sliding groove of the guide rails, as shown in FIG. 1.

BRIEF SUMMARY OF THE INVENTION

In order to overcome at least one deficiency of the prior art, this invention provides a clip locking device.

In order to achieve the above-mentioned objectives, this invention provides a clip locking device including a first clip body, a second clip body, and a fastener. The first clip body is provided with a protruding piece, and the first clip body is slidingly coordinated with the sliding groove at the guide rail by the protruding piece. The fastener is disposed at the first clip body for pressing the first clip body tightly against the guide rail. The second clip body is detachably mated to the first clip body, and a vertical sheet is disposed at the second clip body for coordinating with the locking tongue.

By the first clip body, the protruding piece, and the fastener, mounted the first clip body to the guide rail, and a position of the first clip body at the guide rail can be adjusted by adjusting the fastener, the vertical sheet of the second clip body is used for connecting with the locking tongue; therefore, the clip locking device is suitable for the cargo bed with the guide rail.

Optionally, the clip locking device further may include a screw, and the second clip body is fastened to the first clip body by the screw.

Optionally, the second clip body may be provided with an oblong hole, the first clip body may be provided with a screw hole, the screw is fitted into the screw hole, and the screw passes through the oblong hole.

Mounting the screw and the screw hole is adopted to facilitate disassembly and assembly, and the screw passes through the oblong hole of the second clip body for an convenience of adjusting a relative position between the second clip body and the first clip body, adapting the installation requirements of more sizes.

Optionally, the fastener is a hexagon socket screw, and the fastener is mounted into the screw hole.

The function of the hexagon socket screw is to press the first clip body tightly against the guide rail; when the screw hole for mounting the screw also penetrates the first clip body, the screw can also press the first clip body tightly against the guide rail.

Optionally, the first clip body may have a side stop block, the side stop block is used for clinging to the second clip body.

The side stop block is adapted to cling to the second clip body for ensuring the second clip body does not offset when adjusting the position of the second clip body.

Optionally, the first clip body may have a semi-circular groove, the fastener is located within the semi-circular groove.

The function of the semi-circular groove is to protect the fastener.

Optionally, the second clip body may have a first vertical sheet and a second vertical sheet, the first vertical sheet is used for clinging to the cargo bed, the second vertical sheet is used for connecting with the locking tongue.

Optionally, the clip locking device further includes a silicone sucker, the first clip body may have a screw hole penetrating the two ends thereof, the silicone sucker is mounted at the opening of the screw hole, and the silicone sucker and the screw hole are sealed together, the screw is a flat head screw, and the screw is provided with a notch on the side wall.

The function of increasing the silicone sucker is to increase the fixation strength between the first clip body and the guide rail. Because the clip locking device is used to the pickup truck, however, the pickup truck cannot avoid the phenomenon of vibration during driving, the fastener is used to press the first clip body against the guide rail. When the fit between the fastener and the first clip body becomes loose, the first clip body and the guide rail are liable to become loose, therefore adding the silicone sucker. When the silicone sucker tightly adsorbed to the guide rail, the external vibrations have almost no effect on the adsorption of the two. And the flat head screw is used to avoid the screw puncturing the silicone sucker when screwed in. The notch on the side wall of the screw for serving as a gas channel, when one of the openings of the screw hole is closed, it can be ensured that the screw can be screwed in or out of the screw hole smoothly, and will not be stuck in the screw hole because of the air pressure difference.

Optionally, the clip locking device further includes a rack and a toothed block, the rack is mounted at the second clip body, the first clip body may have a groove, the toothed block is located within the groove, the toothed block meshes with the rack, and the toothed block is in the shape of an isosceles triangle, the tooth block is a magnet tooth block, the rack is an iron rack; when the first clip body and the second clip body are close together, the rack is located within the groove, and the tooth block and the rack mesh together.

The function of setting the rack and the toothed block is to pre-fix. When the second clip body is mounting to the first clip body, and when the screw fixes the first clip body and the second clip body together, if there is no relatively fixed state between the first clip body and the second clip body, the operator must hold the first clip body and the second clip body by hands, therefore, setting the groove, the toothed block, and the rack which are mentioned above, in order to avoid the relative displacement of the first clip body and the second clip body when they are fixed. The cooperation of the rack and the groove plays a limiting role, the cooperation of the toothed block and the rack also plays a limiting role, so that when the first clip body and the second clip body are closed together, it can be ensured that there is no relative displacement between the first clip body and the second clip body when the screw is tightened.

Optionally, the clip locking device further includes an extension sheet, at the edge of the vertical sheet may have an arc-shaped connecting portion, the extension sheet may have an arc-shaped engaging portion that matches the arc-shaped connecting portion, the engaging portion is used for snap-fitting with the connecting portion.

The function of setting the extension sheet is to lengthen the vertical sheet. Because sometimes, the vertical sheet may face the problem of insufficient length, so setting the vertical sheet which is mentioned above. When lengthening the extension sheet to the vertical sheet, only applying glue to the engaging portion, and then the engaging portion and the connecting portion can be cemented, in this way, the vertical sheet (or the extension sheet) and the extension sheet are fixed together.

The beneficial effects of this technical solution lie in: by the first clip body, the protruding piece, and the fastener, mounted the first clip body to the guide rail, and the position of the first clip body on the guide rail can be adjusted by adjusting the fastener.

These and other features, aspects, and advantages of the present invention will become better understood with regard to the following description, appended claims, and accompanying drawings.

Figure 1:
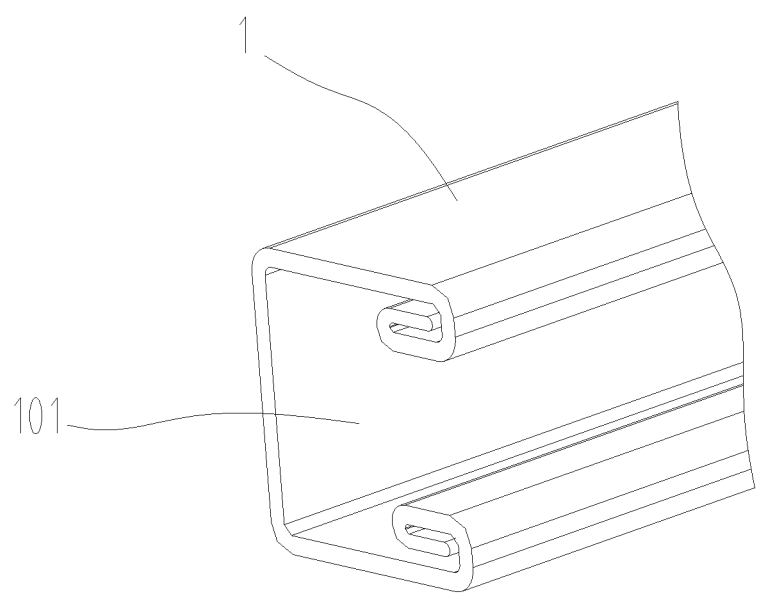
FIG. 1 is a structural schematic diagram of a guide rail.

The reference numerals in the figure are as follows:
1. guide rail; 101. sliding groove; 2. hexagon socket screw; 3. first clip body; 301. protruding piece; 302. screw hole; 303. semi-circular groove; 304. side stop block; 305. groove; 4. second clip body; 401. first vertical sheet; 402. second vertical sheet; 403. oblong hole; 5. screw; 501. notch; 6. cargo bed; 7. locking tongue; 8. silicone sucker; 9. rack; 10. extension sheet; 1001. connecting portion; 1002. engaging portion.

DETAILED DESCRIPTION OF THE INVENTION

These and other objects, features, and advantages of the present invention will become better understood with the following preferred embodiments, accompanying drawings and description in detail.

Embodiment 1

Figure 2:
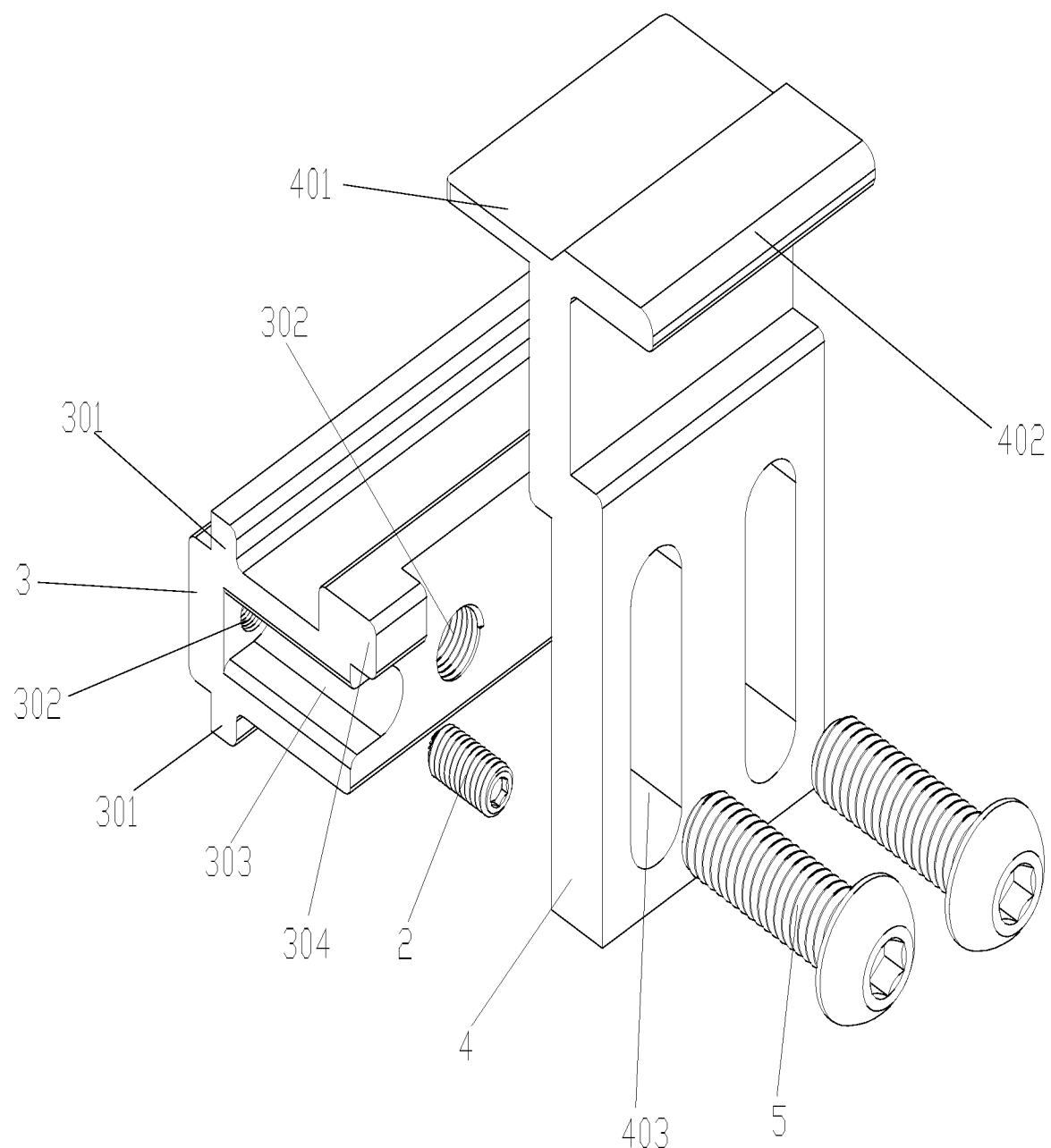
FIG. 2 is a structural schematic diagram of embodiment one.

As shown in FIG. 2, a clip locking device includes a first clip body 3, a second clip body 4, and a hexagon socket screw 2.

Figure 3:
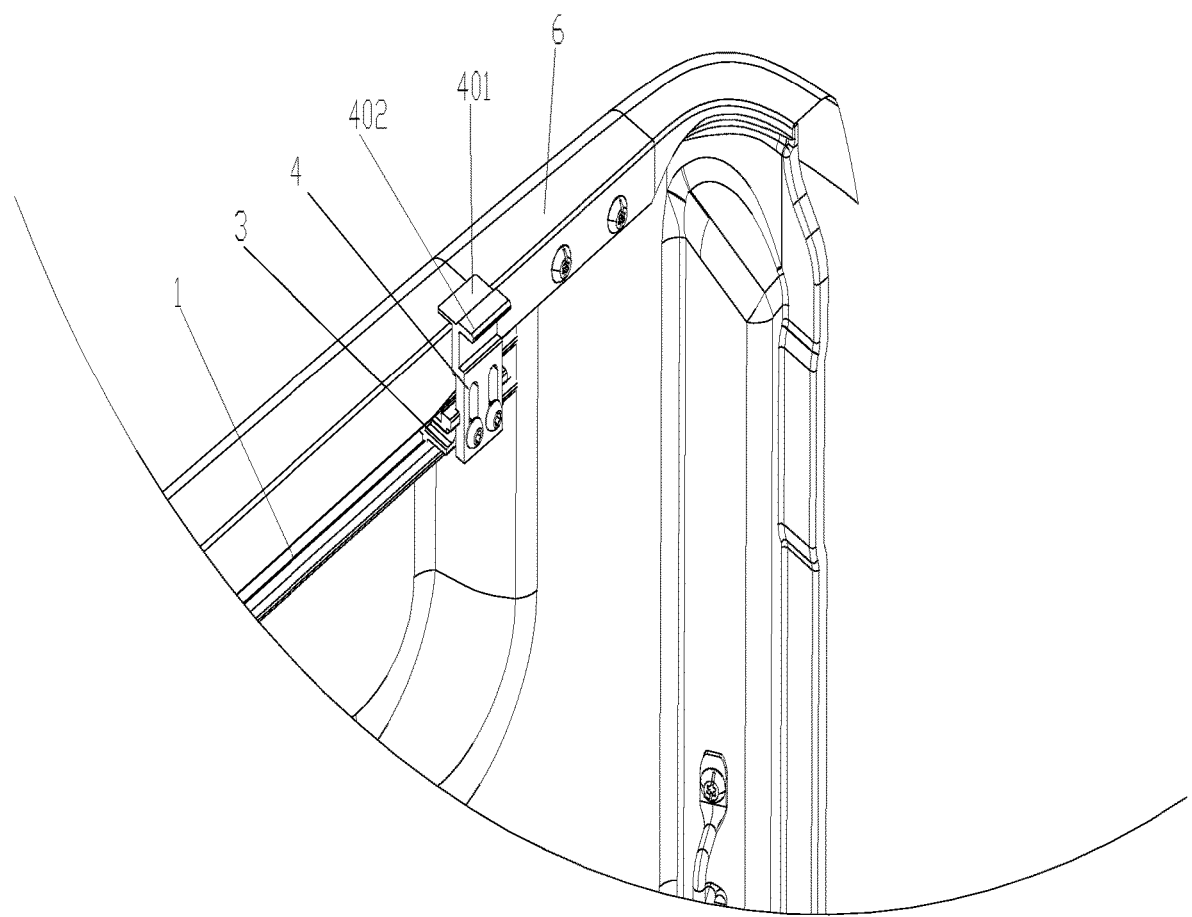
FIG. 3 is an installation structural schematic diagram of embodiment one.

As shown in FIG. 2 and FIG. 3, the first clip body 3 has a protruding piece 301, the first clip body 3 sliding fits with the sliding groove 101 on the guide rail 1 by the protruding piece 301, the first clip body 3 has a screw hole 302, the hexagon socket screw 2 is mounted in the screw hole 302 of the first clip body 3 for pressing the first clip body 3 tightly against the guide rail 1, and the first clip body 3 has a semi-circular groove 303, the hexagon socket screw 2 is located within the semi-circular groove 303.

As shown in FIG. 2, the second clip body 4 has an oblong hole 403, the second clip body 4 is fastened to the first clip body 3 by the screw 5, the screw 5 is fitted together with the screw hole 302, and the screw 5 is passed through the oblong hole 403; and when the screw hole 302 for mounting the screw 5 also penetrates the first clip body 3, the screw 5 can also press the first clip body 3 tightly against the guide rail 1. When adjusting the position of the second clip body 4 on the first clip body 3, it only needs to loosen the screw 5.

As shown in FIG. 2 and FIG. 3, the first clip body 3 has a side stop block 304, the side stop block 304 is used for clinging to the second clip body 4. The side stop block 304 can ensure the second clip body 4 does not offset when adjusting the position of the second clip body 4.

Figure 4:
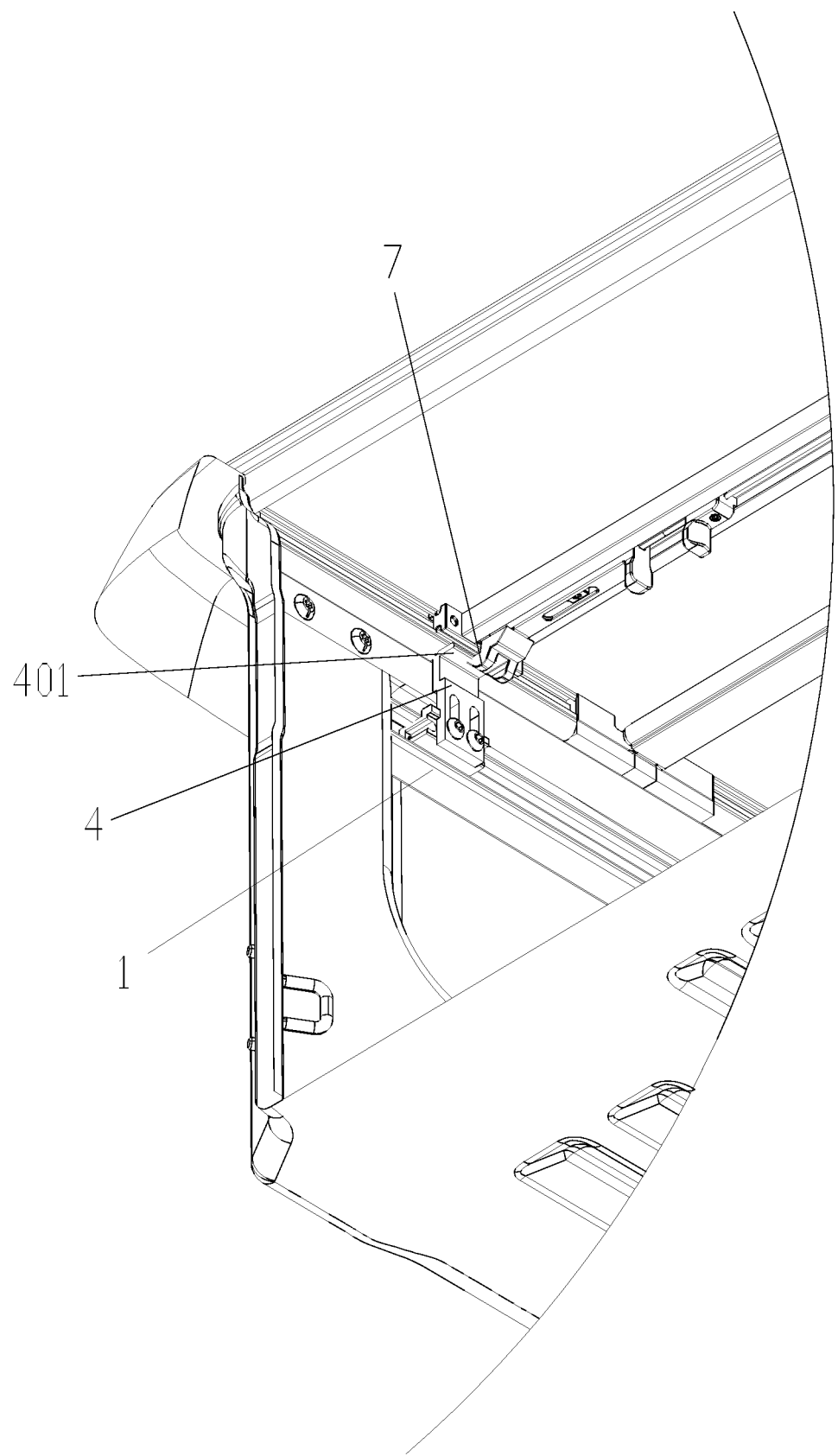
FIG. 4 is a usage schematic diagram of embodiment one.

As shown in FIG. 2 and FIG. 4, the second clip body 4 has a first vertical sheet 401 and a second vertical sheet 402, the first vertical sheet 401 is used for clinging to the cargo bed 6, the second vertical sheet 402 is used for connecting with the locking tongue 7.

In this embodiment, the fastener is the hexagon socket screw 2, in other equivalent embodiments, components such as bolts may also be used.

Embodiment 2

Figure 5:
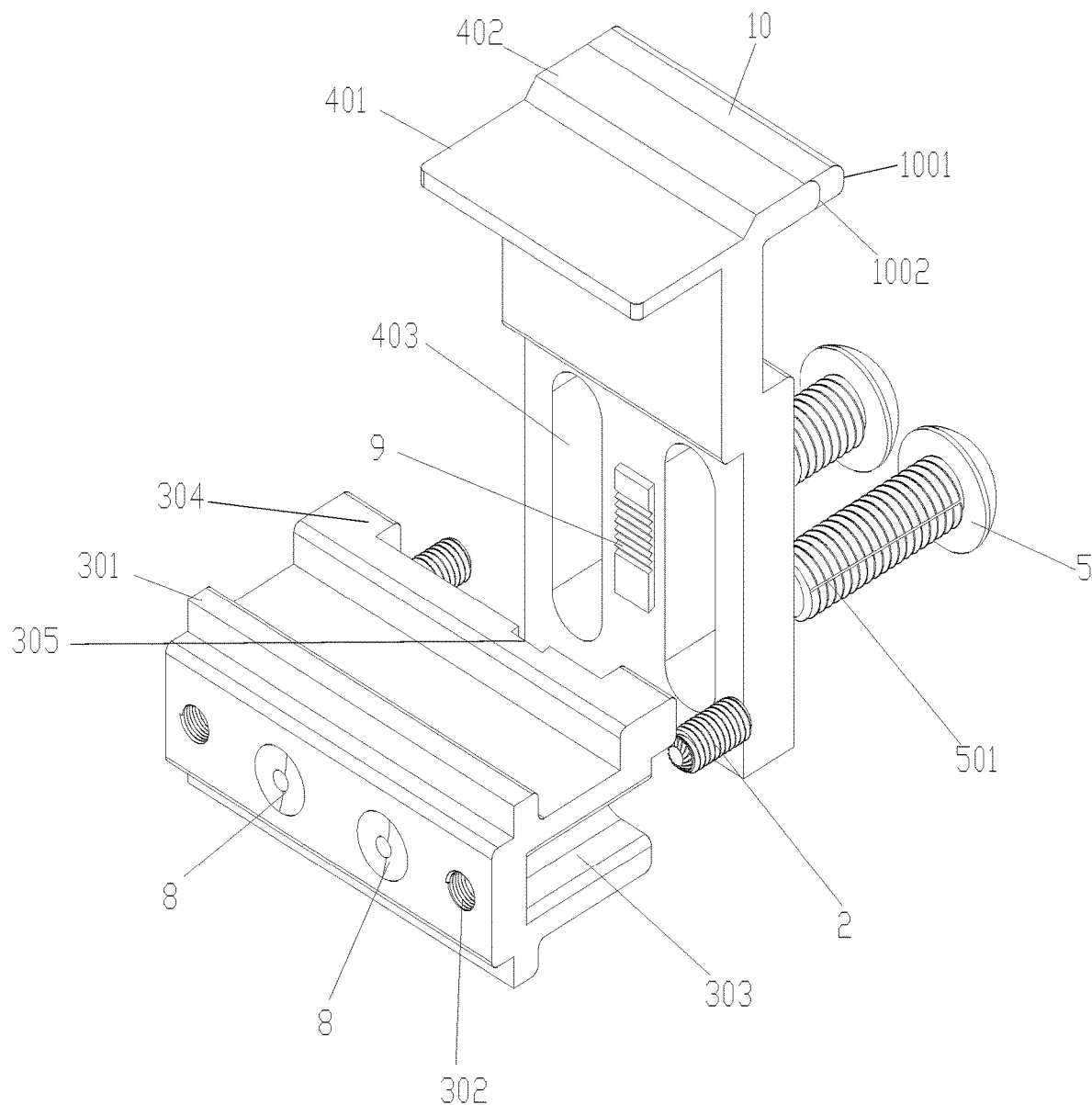
FIG. 5 is a structural schematic diagram of embodiment two.

As shown in FIG. 5, a clip locking device includes a first clip body 3, a second clip body 4, and a hexagon socket screw 2.

As shown in FIG. 3 and FIG. 5, the first clip body 3 has a protruding piece 301, the first clip body 3 sliding fits with the sliding groove 101 on the guide rail 1 by the protruding piece 301, the first clip body 3 has a screw hole 302, the hexagon socket screw 2 is mounted in the screw hole 302 of the first clip body 3 for pressing the first clip body 3 tightly against the guide rail 1, and the first clip body 3 has a semi-circular groove 303, the hexagon socket screw 2 is located within the semi-circular groove 303.

As shown in FIG. 5, the second clip body 4 has an oblong hole 403, the second clip body 4 is fastened to the first clip body 3 by the screw 5, the screw 5 is fitted together with the screw hole 302, and the screw 5 is passed through the oblong hole 403; and when the screw hole 302 for mounting the screw 5 also penetrates the first clip body 3, the screw 5 can also press the first clip body 3 tightly against the guide rail 1. When adjusting the position of the second clip body 4 on the first clip body 3, it only needs to loosen the screw 5.

As shown in FIG. 5, the clip locking device further includes a silicone sucker 8, the first clip body 3 has a screw hole 302 penetrating the two ends thereof, the silicone sucker 8 is mounted at the opening of the screw hole 302, and the silicone sucker 8 and the screw hole 302 are sealed together, the screw 5 is a flat head screw 5, and the screw 5 is provided with a notch 501 on the side wall.

The function of increasing the silicone sucker 8 is to increase the fixation strength between the first clip body 3 and the guide rail 1. Because the clip locking device is used to the pickup truck, however, the pickup truck cannot avoid the phenomenon of vibration during driving, the fastener is used to press the first clip body 3 against the guide rail 1, when the fit between the fastener and the first clip body 3 becomes loose, the first clip body 3 and the guide rail 1 are liable to become loose, therefore adding the silicone sucker 8, when the silicone sucker 8 tightly adsorbed to the guide rail 1, the external vibrations have almost no effect on the adsorption of the two. And the flat head screw is used to avoid the screw 5 puncturing the silicone sucker 8 when screwed in. The notch 501 on the side wall of the screw 5 for serving as a gas channel, when one of the openings of the screw hole 302 is closed, it can be ensured that the screw 5 can be screwed in or out of the screw hole 302 smoothly, and will not be stuck in the screw hole 302 because of the air pressure difference.

As shown in FIG. 5, the first clip body 3 has a side stop block 304, the side stop block 304 is used for clinging to the second clip body 4. The side stop block 304 can ensure the second clip body 4 does not offset when adjusting the position of the second clip body 4.

As shown in FIG. 5, the clip locking device further includes a rack 9 and a toothed block (It is not shown in the attached drawing as it is not visible from the angle of view), the rack 9 is mounted at the second clip body 4, the first clip body 3 has a groove 305, the toothed block is located within the groove 305, the toothed block meshes with the rack 9, and the toothed block is in the shape of an isosceles triangle, the tooth block is a magnet tooth block, the rack 9 is an iron rack 9; when the first clip body 3 and the second clip body 4 are close together, the rack 9 is located within the groove 305, and the tooth block and the rack 9 mesh together.

The function of setting the rack 9 and the toothed block is to pre-fix. When the second clip body 4 is mounting to the first clip body 3, and when the screw 5 fixes the first clip body 3 and the second clip body 4 together, if there is no relatively fixed state between the first clip body 3 and the second clip body 4, the operator must hold the first clip body 3 and the second clip body 4 by hands, therefore, setting the groove 305, the toothed block, and the rack 9 which are mentioned above, in order to avoid the relative displacement of the first clip body 3 and the second clip body 4 when they are fixed. The cooperation of the rack 9 and the groove 305 plays a limiting role, the cooperation of the toothed block and the rack 9 also plays a limiting role, so that when the first clip body 3 and the second clip body 4 are closed together, it can be ensured that there is no relative displacement between the first clip body 3 and the second clip body 4 when the screw 5 is tightened.

Referring to FIG. 5 and combining with FIG. 4, the second clip body 4 has a first vertical sheet 401 and a second vertical sheet 402, the first vertical sheet 401 is used for clinging to the cargo bed 6, the second vertical sheet 402 is used for connecting with the locking tongue 7. The clip locking device further includes an extension sheet 10, at the edge of the vertical sheet has an arc-shaped connecting portion 1001, the extension sheet 10 has an arc-shaped engaging portion 1002 that matches the arc-shaped connecting portion 1001, the engaging portion 1002 is used for snap-fitting with the connecting portion 1001.

In this embodiment, the fastener is the hexagon socket screw 2, in other equivalent embodiments, components such as bolts may also be used. In this embodiment, the extension sheet 10 is fitted to the second vertical sheet 402, in other equivalent embodiments, the extension sheet 10 may be fitted to the first vertical sheet 401.

Although the present invention has been described in considerable detail with reference to certain preferred embodiments thereof, the disclosure is not for limiting the scope of the invention. Persons has ordinary skill in the art may make various modifications and changes without departing from the scope and spirit of the invention. Therefore, the scope of the appended claims should not be limited to the description of the preferred embodiments described above.

What is claimed is:

1. A clip locking device for mounting a cover to a cargo bed of a pickup truck, wherein the cover has a locking tongue, and the cargo bed has a guide rail with a sliding groove;
    wherein the clip locking device comprises a first clip body, a fastener, and a second clip body; a protruding piece is disposed at the first clip body, the first clip body is slidingly coordinated with the sliding groove at the guide rail by the protruding piece; the fastener is disposed at the first clip body for pressing the first clip body tightly against the guide rail, the second clip body is detachably mated to the first clip body, and two horizontal sheets are disposed at the second clip body for coordinating with the locking tongue.

2. The clip locking device of claim 1, wherein the clip locking device further comprises a screw, and the second clip body is fastened to the first clip body by the screw.

3. The clip locking device of claim 2, wherein the second clip body is provided with an oblong hole, the first clip body is provided with a screw hole, the screw fits into the screw hole together, and the screw passes through the oblong hole.

4. The clip locking device of claim 3, wherein the fastener is a hexagon socket screw, and the hexagon socket screw is mounted in the screw hole.

5. The clip locking device of claim 3, wherein a side stop block is disposed at the first clip body, and the side stop block is used for fastening to the second clip body.

6. The clip locking device of claim 1, wherein the first clip body is provided with a semi-circular groove, and the fastener is located within the semi-circular groove.

7. The clip locking device of claim 1, wherein the two horizontal sheets includes a first horizontal sheet and a second horizontal sheet the second clip body is provided with the first horizontal sheet and the second horizontal sheet, the first horizontal sheet is used for fastening to the cargo bed, and the second horizontal sheet is used for coordinating with the locking tongue.

8. The clip locking device of claim 2, wherein the clip locking device further comprises a silicone sucker, the first clip body is provided with a screw hole penetrating two ends of the first clip body, an end of the silicone sucker is disposed at an opening of the screw hole, the silicone sucker and the screw hole are sealed together, the screw is a flat head screw, and a notch is disposed at a side wall of the screw.

9. The clip locking device of claim 8, wherein the clip locking device further comprises a rack and a toothed block, the rack is disposed at the second clip body, the first clip body is provided with a groove, the toothed block is located within the groove, the toothed block meshes with the rack, and the toothed block is in a shape of an isosceles triangle, the tooth block is a magnet tooth block, the rack is an iron rack; when the first clip body and the second clip body are close and fastened together, the rack is located within the groove, and the tooth block is engaged with the rack.

10. The clip locking device of claim 8, wherein the clip locking device further comprises an extension sheet, an arc-shaped connecting portion is disposed at an edge of the second horizontal sheet, the extension sheet is provided with an arc-shaped engaging portion that matches the arc-shaped connecting portion, and the engaging portion is used for snap-fitting with the connecting portion.

* * * * *